United States Patent [19]
Chang et al.

[11] Patent Number: 6,130,912
[45] Date of Patent: Oct. 10, 2000

[54] HIERARCHICAL MOTION ESTIMATION PROCESS AND SYSTEM USING BLOCK-MATCHING AND INTEGRAL PROJECTION

[75] Inventors: Ching-Fang Chang, San Jose, Calif.; Naofumi Yanagihara, Tokyo, Japan

[73] Assignees: Sony Electronics, Inc., Park Ridge, N.J.; Sony Corporation, Tokyo, Japan

[21] Appl. No.: 09/093,307

[22] Filed: Jun. 9, 1998

[51] Int. Cl.[7] .................................................. H04N 7/12
[52] U.S. Cl. ............................. 375/240.16; 375/240.24
[58] Field of Search ................................. 348/699, 384, 348/390, 416, 420, 408; 375/240.16, 240.24; H04N 7/12

[56] References Cited

U.S. PATENT DOCUMENTS

| | | | |
|---|---|---|---|
| 5,576,772 | 11/1996 | Kondo ..................................... | 348/699 |
| 5,635,994 | 6/1997 | Drexler et al. .......................... | 348/699 |
| 5,706,059 | 1/1998 | Ran et al. ................................ | 348/699 |
| 5,710,603 | 1/1998 | Lee ......................................... | 348/699 |
| 5,715,017 | 2/1998 | Naito et al. ............................. | 348/699 |
| 5,719,642 | 2/1998 | Lee ......................................... | 348/699 |
| 5,721,595 | 2/1998 | Chen et al. .............................. | 348/699 |

OTHER PUBLICATIONS

Dufaux, Frédéric et al., "Motion Estimation Techniques for Digital TV: A Review and a New Contribution," Proceedings of the IEEE, vol. 83, No. 6, Jun. 1995, pp. 858–875.

Jain, Jaswant R. et al., "Displacement Measurement and Its Application in Interframe Image Coding," IEEE Transactions on Communications, vol. Com–29, No. 12, Dec. 1981, pp. 1799–1808.

Ogura Eiji et al., "A Cost Effective Motion Estimation Processor LSI Using a Simple and Efficient Algorithm," IEEE Transactions on Consumer Electronics, vol. 41, No. 3, Aug. 1995, pp. 690–698.

The David Sarnoff Research Center, "MPEG–2: Gains in Picture Quality Lower Cost," 1995, 5 pages.

Seferidis, Vassilis et al., "General Approach to Block–Matching Motion Estimation," Optical Engineering, vol. 32, No. 7, Jul. 1993, pp. 1464–1473.

Srinivasan, R. et al., "Predictive Coding Based on Efficient Motion Estimation," IEEE Science, Systems & Services for Communications, 1984, pp. 521–526.

Wang, Bor–Min et al., "Zero Waiting–Cycle Hierarchical Block Matching Algorithm and its Array Architectures," IEEE Transactions on Circuits and Systems for Video Technology, vol. 4, No. 1, Feb. 1994, pp. 18–28.

(List continued on next page.)

*Primary Examiner*—Young Lee
*Attorney, Agent, or Firm*—Finnegan, Henderson, Farabow, Garrett & Dunner, L.L.P.

[57] ABSTRACT

Methods and systems of the present invention obtain a motion vector between two frames of video image data. Specifically, methods and systems of the present invention may be used to estimate a motion vector for each macroblock of a current frame with respect to a reference frame in a multi-stage operation. In a first stage, an application implementing the process of the present invention coarsely searches a first search area of the reference frame to obtain a candidate supermacroblock that best approximates a supermacroblock in the current frame. In a second stage, the supermacroblock is divided into a plurality of macroblocks. Each of the macroblocks is used to construct search areas which are then searched to obtain a candidate macroblock that best appropriates a macroblock in the current frame. Additional stages may be used to further fine-tune the approximation to the macroblock. The methods and systems of the present invention may be used in optimizing digital video encoders, decoders, and video format converters.

32 Claims, 9 Drawing Sheets

OTHER PUBLICATIONS

Wuertele, David, "The Inverted Half–Pel Resolution Block Search," The 1993 Symposium on Image Coding (PCSJ93), pp. 55–56.

Lee et al., "A Fast Block Matching Algorithm Using Integral Projections," Proceedings Tencon '87 Conference, 1987 IEEE Region 10 Conference, vol. 2 of 3, 1987, pp. 590–594.

Mitchell et al., "MPEG Video Compression Standard," International Thomson Publishing, 1997, pp. 284–286, 301–311.

Jong, et al., "Parallel Architectures for 3–Step Hierarchical Search Block–Matching Algorithm," IEEE Transactions on Circuits and Systems for Video Technology, vol. 4, No. 4, Aug. 1994, pp. 407–416.

Vertical Integral Projection

Horizontal Integral Projection

HIERARCHICAL MOTION ESTIMATION PROCESS AND SYSTEM USING BLOCK-MATCHING AND INTEGRAL PROJECTION

BACKGROUND OF THE INVENTION

The present invention relates generally to methods and apparatus for motion estimation for video image processing, and in particular, is directed to improved methods and apparatus for determining motion vectors between frames of video images using a hierarchical motion estimation technique using block-matching and integral projection data.

Advancements in digital technology have produced a number of digital video applications. Digital video is currently used in digital and high definition TV, videoconferencing, computer imaging, and high-quality video tape recorders. Uncompressed digital video signals constitute a huge amount of data and therefore require a large amount of bandwidth and memory to store and transmit. Many digital video systems, therefore, reduce the amount of digital video data by employing data compression techniques that are optimized for particular applications. Digital compression devices are commonly referred to as "encoders"; devices that perform decompression are referred to as "decoders". Devices that perform both encoding and decoding are referred to as "codecs".

In the interest of standardizing methods for motion picture video compression, the Motion Picture Experts Group (MPEG) issued a number of standards for digital video processing. MPEG-1 addresses digital audio and video coding and is commonly used by video devices needing intermediate data rates. MPEG-2 is used with devices using higher data rates, such as direct broadcast satellite systems.

Motion picture video sequences consist of a series of still pictures or "frames" that are sequentially displayed to provide the illusion of continuous motion. Each frame may be described as a two-dimensional array of picture elements, or "pixels". Each pixel describes a particular point in the picture in terms of brightness and hue. Pixel information can be represented in digital form, or encoded, and transmitted digitally.

One way to compress video data is to take advantage of the redundancy between neighboring frames of a video sequence. Since neighboring frames tend to contain similar information, describing the difference between frames typically requires less data than describing the new frame. If there is no motion between frames, for example, coding the difference (zero) requires less data than recoding the entire frame.

Motion estimation is the process of estimating the displacement between neighboring frames. Displacement is described as the motion vectors that give the best match between a specified region in the current frame and the corresponding displaced region in a previous or subsequent reference frame. The difference between the specified region in the current frame and the corresponding displaced region in the reference frame is referred to as "residue".

In general, there are two known types of motion estimation methods used to estimate the motion vectors: pixel-recursive algorithms and block-matching algorithms. Pixel-recursive techniques predict the displacement of each pixel iteratively from corresponding pixels in neighboring frames. Block-matching algorithms, on the other hand, estimate the displacement between frames on a block-by-block basis and choose vectors that minimize the difference.

In conventional block-matching processes, the current image to be encoded is divided into equal-sized blocks of pixel information. In MPEG-1 and MPEG-2 video compression standards, for example, the pixels are grouped into "macroblocks" consisting of a 16×16 sample array of luminance samples together with one 8×8 block of samples for each of the two chrominance components. The 16×16 array of luminance samples further comprises four 8×8 blocks that are typically used as input blocks to the compression models.

FIG. 1 illustrates one iteration of a conventional block-matching process. Current frame 120 is shown divided into blocks. Each block can be any size, however, in an MPEG device, for example, current frame 120 would typically be divided into 16×16-sized macroblocks. To code current frame 120, each block in current frame 120 is coded in terms of its difference from a block in a previous frame 110 or upcoming frame 130. In each iteration of a block-matching process, current block 100 is compared with similar-sized "candidate" blocks within search range 115 of preceding frame 110 or search range 135 of upcoming frame 130. The candidate block of the preceding or upcoming frame that is determined to have the smallest difference with respect to current block 100 is selected as the reference block, shown in FIG. 1 as reference block 150. The motion vectors and residues between reference block 150 and current block 100 are computed and coded. Current frame 120 can be restored during decompression using the coding for each block of reference frame 110 as well as motion vectors and residues for each block of current frame 120.

Difference between blocks may be calculated using any one of several known criterion, however, most methods generally minimize error or maximize correlation. Because most correlation techniques are computationally intensive, error-calculating methods are more commonly used. Examples of error-calculating measures include mean square error (MSE), mean absolute distortion (MAD), and sum of absolute distortions (SAD). These criteria are described in Joan L. Mitchell et al., *MPEG Video Compression Standard,* International Thomson Publishing (1997), pp. 284–86. SAD is a commonly used matching criterion. SAD is defined as:

$$SAD(i, j) = \sum_{x=0}^{M-1} \sum_{y=0}^{N-1} |r(x, y) - s(x+i, y+j)|$$

where block size is M×N, r(x,y) is the current block and s(x+i,y+j) is the candidate block within a search area 115 in the reference frame. The motion vector is the value (i,j) that results in the minimum value for SAD(i,j).

A block-matching algorithm that compares the current block to every candidate block within the search range is called a "full search". In general, larger search areas generally produce a more accurate displacement vector, however, the computational complexity of a full search is proportional to the size of the search area and is too slow for some applications. A full search block-matching algorithm applied on a macroblock of size 16×16 pixels over a search range of ±N pixels with one pixel accuracy, for example, requires $(2 \times N+1)^2$ block comparisons. For N=16, 1089 16×16 block comparisons are required. Because each block comparison requires 16×16, or 256, calculations, this method is computationally intensive and operationally very slow. Techniques that simply reduce the size of the search area, however, run a greater risk of failing to find the optimal matching block.

As a result, there has been much emphasis on producing fast algorithms for finding the matching block within a wide search range. Several of these techniques are described in Mitchell et al., pp. 301–11. Most fast search techniques gain speed by computing the displacement only for a sparse sampling of the full search area. The 2-D logarithmic search, for example, reduces the number of computations by computing the MSE for successive blocks moving in the direction of minimum distortion. In a conjugate direction search, the algorithm searches in a horizontal direction until a minimum distortion is found. Then, proceeding from that point, the algorithm searches in a vertical direction until a minimum is found. Both of these methods are faster than a full search but frequently fail to locate the optimal matching block.

Another method for reducing the amount of computation in a full search is to calculate the displacement between blocks using integral projection data rather than directly using spatial domain pixel information. An integral projection of pixel information is a one-dimensional array of sums of image pixel values along a horizontal or vertical direction. Using two 1-D horizontal and vertical projection arrays rather than the 2-dimensional array of pixel information in a block-matching algorithm significantly reduces the number of computations of each block-matching. This technique is described in a paper by I. H. Lee and R. H. Park entitled "Fast Block Matching Algorithms Using Integral Projections," Proc. Tencon '87 Conf., 1987, pp. 590–594.

Fast motion estimation techniques are particularly useful when converting from one digital video format to another. Digital video is stored in encoded, compressed form. When converting from one format to another using conventional devices, the digital video must first be decompressed and decoded to its original pixel form and then subsequently encoded and compressed for storage or transmission in the new format. Conversion techniques requiring that digital video be fully decoded are very time-consuming.

Other methods for overcoming the disadvantages of a full search have employed hierarchical search techniques. In a first stage, for example, a coarse search is performed over a reasonably large area. In successive stages of a conventional hierarchical search, the size of the search area is reduced. One example of a three-step hierarchical search is described in H. M. Jong et al., "Parallel Architectures for 3-Step Hierarchical Search Block-Matching Algorithm," IEEE Trans. On Circuits and Systems for Video Technology, Vol. 4, August 1994, pp. 407–416. The hierarchical search described in Jong et al. is inadequate for some applications because the coarse search does not utilize all of the pixel information and thus may form an incorrect starting point for the finer search.

The present invention provides improved methods and apparatus for the motion estimation process by a performing a fast hierarchical search that minimizes the number of block comparisons while maintaining the quality of the motion vector. In addition, the present invention provides methods and apparatus for motion estimation using the hierarchical search process of the present invention and integral projection to further minimize the number of operations. The present invention further provides methods and apparatus for hierarchical motion estimation using integral projection that allow digital video data conversion from one format to a second format without full reduction to pixel data thereby greatly reducing the time required for data format conversion.

SUMMARY OF THE INVENTION

A method for obtaining a motion vector between first and second frames of video image data consistent with the present invention comprises the steps of (a) determining a current macroblock of the first frame comprising a two-dimensional array of pixel information; (b) determining a current supermacroblock of the first frame comprising the current macroblock and a plurality of neighboring macroblocks; (c) selecting a first search area of the second frame based on the current supermacroblock and a first search range; (d) determining a best candidate supermacroblock in the first search area based on a displacement criterion and the current supermacroblock; (e) dividing the best candidate supermacroblock into a plurality of candidate macroblocks; (f) selecting a plurality of secondary search areas of the second frame based on the plurality of candidate macroblocks and a second search range; (g) determining a first best candidate macroblock in the second search area based on the displacement criterion and the current macroblock; and (h) determining a first motion vector representing the distance between the current macroblock and the first best candidate macroblock.

An apparatus for obtaining a motion vector between first and second frames of video image data comprises a memory having program instructions, and a processor configured to use the program instructions to perform the steps of (a) determining a current macroblock of the first frame comprising a two-dimensional array of pixel information; (b) determining a current supermacroblock of the first frame comprising the current macroblock and a plurality of neighboring macroblocks; (c) selecting a first search area of the second frame based on the current supermacroblock and a first search range; (d) determining a best candidate supermacroblock in the first search area based on a displacement criterion and the current supermacroblock; (e) dividing the best candidate supermacroblock into a plurality of candidate macroblocks; (f) selecting a plurality of secondary search areas of the second frame based on the plurality of candidate macroblocks and a second search range; (g) determining a first best candidate macroblock in the second search area based on the displacement criterion and the current macroblock; and (h) determining a first motion vector representing the distance between the current macroblock and the first best candidate macroblock.

According to another aspect of the invention, a computer program product comprises a computer-usable medium having computer-readable code embodied therein for obtaining a motion vector between first and second frames of video image data, the computer-usable medium comprising (a) a component configured to determine a current macroblock of the first frame comprising a two-dimensional array of pixel information; (b) a component configured to determine a current supermacroblock of the first frame comprising the current macroblock and a plurality of neighboring macroblocks; (c) a component configured to select a first search area of the second frame based on the current supermacroblock and a first search range; (d) a component configured to determine a best candidate supermacroblock in the first search area based on a displacement criterion and the current supermacroblock; (e) a component configured to divide the best candidate supermacroblock into a plurality of candidate macroblocks; (f) a component configured to select a plurality of secondary search areas of the second frame based on the plurality of candidate macroblocks and a second search range; (g) a component configured to determine a first best candidate macroblock in the second search area based on the displacement criterion and the current macroblock; and (h) a component configured to determine a first motion vector representing the distance between the current macroblock and the first best candidate macroblock.

Furthermore, a system for obtaining a motion vector between first and second frames of video image data comprises (a) means for determining a current macroblock of the first frame comprising a two-dimensional array of pixel information; (b) means for determining a current supermacroblock of the first frame comprising the current macroblock and a plurality of neighboring macroblocks; (c) means for selecting a first search area of the second frame based on the current supermacroblock and a first search range; (d) means for determining a best candidate supermacroblock in the first search area based on a displacement criterion and the current supermacroblock; (e) means for dividing the best candidate supermacroblock into a plurality of candidate macroblocks; (f) means for selecting a plurality of secondary search areas of the second frame based on the plurality of candidate macroblocks and a second search range; (g) means for determining a first best candidate macroblock in the second search area based on the displacement criterion and the current macroblock; and (h) means for determining a first motion vector representing the distance between the current macroblock and the first best candidate macroblock.

BRIEF DESCRIPTION OF THE DRAWINGS

The accompanying drawings, which are incorporated in and constitute a part of this specification, illustrate the invention and, together with the description, serve to explain the principles of the invention.

DESCRIPTION OF THE PREFERRED EMBODIMENTS

Reference will now be made in detail to preferred implementations consistent with the present invention, an example of which is illustrated in the accompanying drawings.

A. Hierarchical Search Process

Motion estimation techniques compress the amount of data needed to represent a digital video sequence by encoding one frame in terms of its difference from a neighboring frame rather than encoding each frame in its entirety. When the sequence is replayed, the decoder reconstructs the current frame using the reference frame and the motion vectors.

In a method consistent with the present invention, a motion vector is estimated for each block of a current frame with respect to a reference frame in a multi-stage operation. In a first stage, an application implementing the process of the present invention coarsely searches a first search area of the reference frame to obtain a candidate supermacroblock that best approximates the current supermacroblock. In a second stage, the supermacroblock is divided into a plurality of macroblock components. The plurality of macroblock components are used to construct search areas which are searched to obtain a candidate macroblock. Additional stages may be used to further fine-tune the approximation to the current macroblock.

Figure 1:
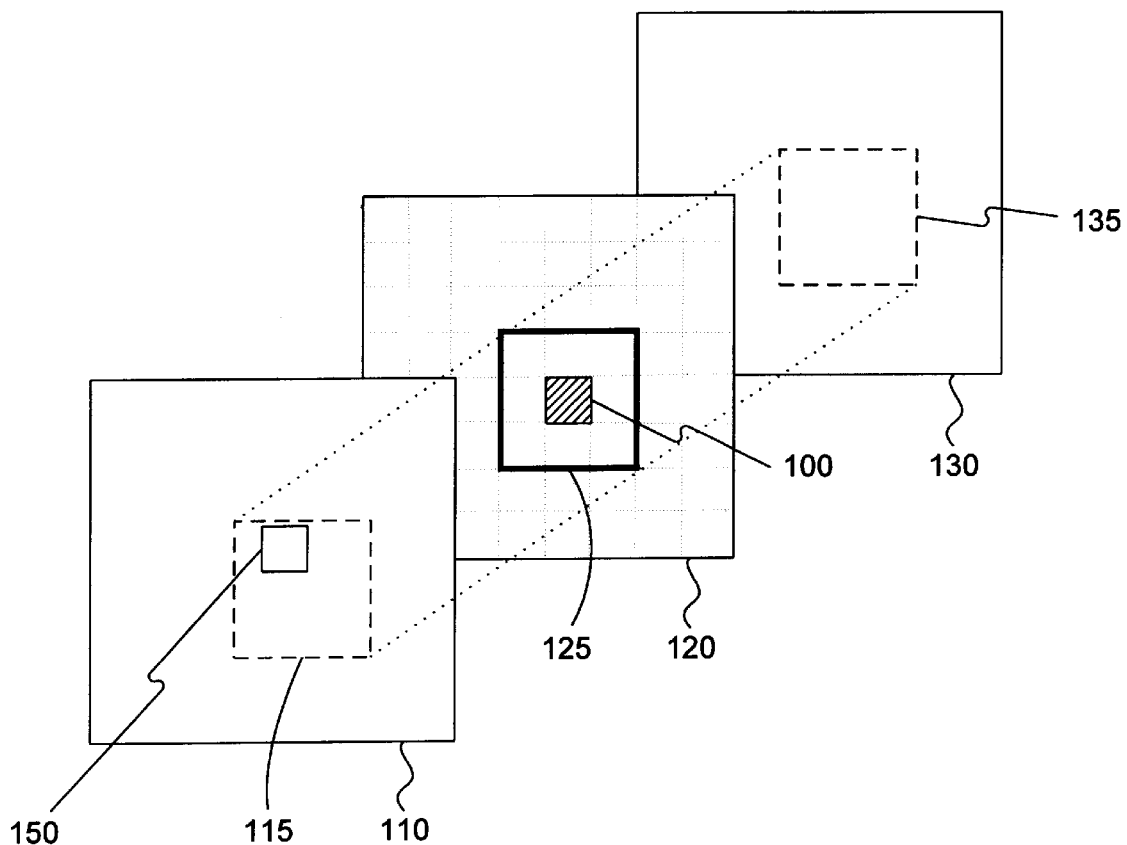
FIG. 1 is a diagram illustrating a prior art block-matching technique.
Figure 2:
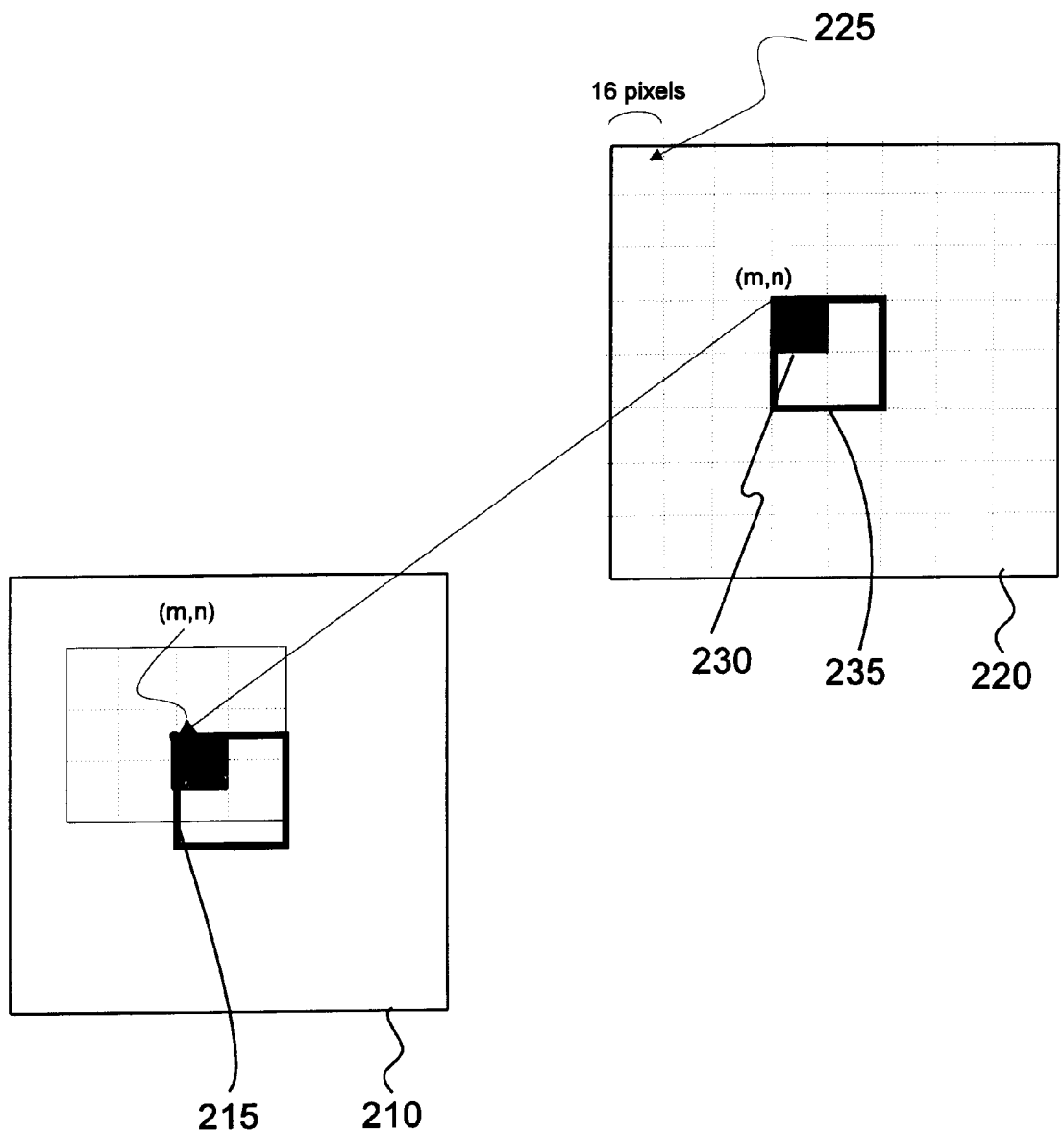
FIG. 2 is a diagram illustrating a step of selecting a search area for a block-matching search consistent with the present invention.

FIG. 2 shows current frame 220 and reference frame 210, which may be a previous frame or an upcoming frame. Current frame 220 is shown divided into a plurality of macroblocks 225, each macroblock comprising M×N pixels. M and N may represent any integer values greater than one; however, in the following example, M=N=16, the standard size of a macroblock in MPEG-1/2 video compression standards. To represent current frame 220, each macroblock 225 in current frame 220 is represented as residues between a macroblock in the current frame and a macroblock in the reference frame.

Figure 3A:
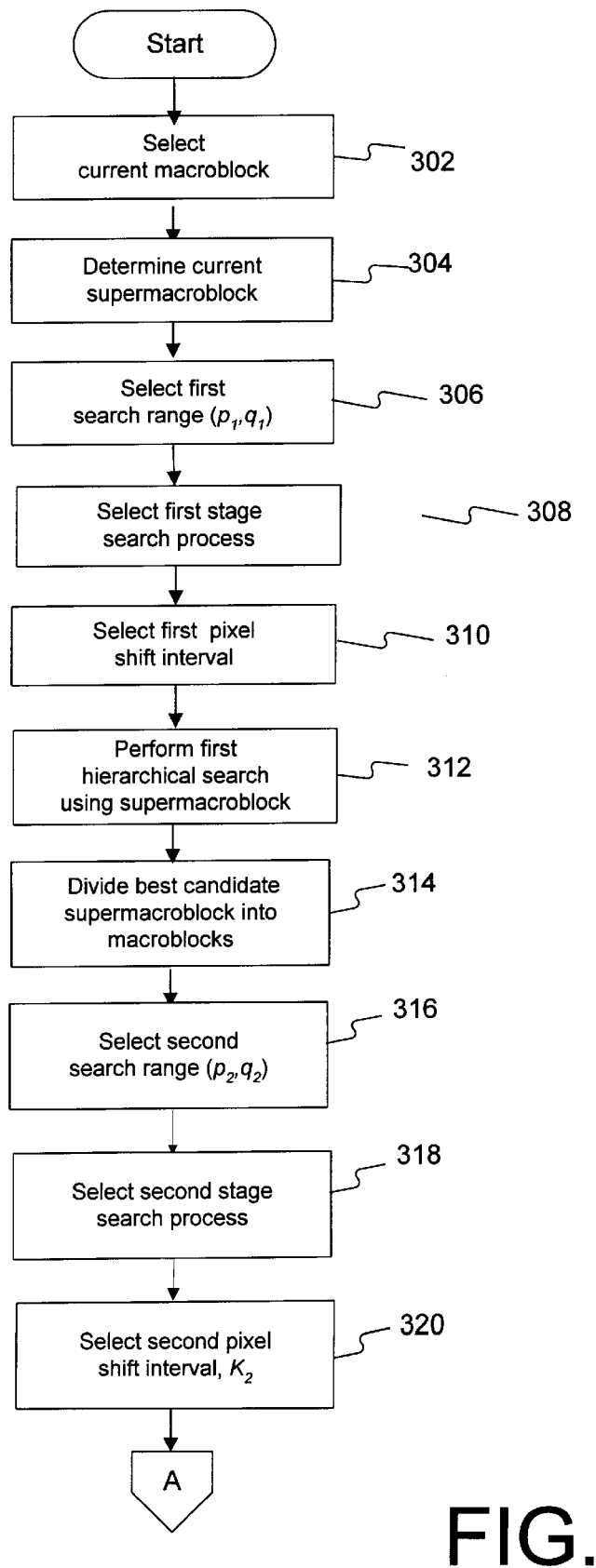
FIGS. 3A and 3B are a flow diagram illustrating a method for performing a hierarchical search consistent with the present invention.
Figure 3B:
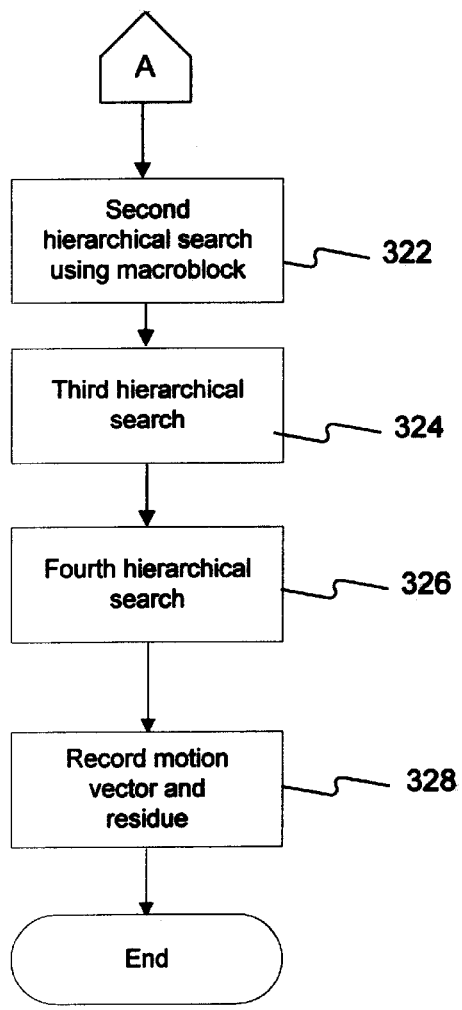

FIGS. 3A and 3B contain a flow chart illustrating a method for estimating a motion vector for one macroblock using a hierarchical searching method consistent with the present invention. To begin, the process selects current macroblock 230 of current frame 220 as shown in FIG. 2 (Step 302). Current macroblock 230 is of size M×N pixels. M and N may represent any integer values greater than one, however, in the following example M=N=16.

Next, current supermacroblock 235 is determined using current macroblock 230 (step 304). Current supermacroblock 235 consists of current macroblock 230 and some number of neighboring macroblocks of the same general size and shape as current macroblock 230. In FIG. 2, for example, current supermacroblock 235 consists of four macroblocks of current frame 220 configured so that current macroblock 230 is in the upper left hand corner.

Referring again to FIG. 3A, the next step is to select a search area 215 of reference frame 210 (Step 306). Search area 215 of FIG. 2 is defined by a search range ($\pm p_1$, $\pm q_1$) and is based on the location of current supermacroblock 235 in current frame 220. Search range values $p_1$ and $q_1$ may be predetermined or may be determined dynamically. Search range values $p_1$ and $q_1$ can be any values greater than zero, but less than the frame size. Although larger search sizes generally produce a more accurate motion vector, selecting search range values $p_1$ and $q_1$ to be less than the full frame size is recommended because the operational complexity of the search may grow in proportional to the search range. For the purposes of illustration only, the following example assumes that search range ($\pm p_1$, $\pm q_1$) is defined as ($\pm 32, \pm 24$). In FIG. 2, the point marked (m,n) refers to the point in reference frame 210 in a position corresponding to the upper left pixel (m,n) of current supermacroblock 235 in current frame 220. Assuming the search range equals ($\pm 32, \pm 24$), search area 215 is the area bounded by (m−32, n−24), (m+32, n−24), (m+32, n+24), and (m−32, n+24) as shown in FIG. 2. Search area 215 confines the upper left corners of all possible candidate supermacroblocks in reference frame 210.

In a first stage of a hierarchical motion estimation process consistent with the present invention, candidate supermacroblocks in search area 215 are compared with current supermacroblock 235 to find the "best" candidate supermacroblock in search area 215. A "best" candidate supermacroblock is defined as the supermacroblock that produces the least error or greatest correlation when compared with current supermacroblock 235 using any known error calculation or correlation determination method.

In step 308, the process selects a first stage search process. Candidate supermacroblocks may be chosen using any publicly available block-matching search method, such as a conventional full search, or may be chosen by comparing supermacroblocks at some predetermined pixel search interval within the search area. In one embodiment of the present invention, the "best" candidate supermacroblock is selected using the motion estimation method described in U.S. patent application Ser. No. 09/081,279, to Chang et al., filed on May 20, 1998, entitled "Motion Estimation Process and System Using Sparse Block-Matching and Integral Projection", the contents of which are hereby expressly incorporated by reference.

Many available search methods, including a conventional full search and the search described in Chang et al., may be performed at a variety of pixel shift intervals. A pixel shift interval $K_1$ of one pixel, for example, results in a fine search whereby a block comparison is made every one pixel. Full searches at one pixel intervals are computationally intensive, however, therefore a larger pixel shift interval at this stage is recommended. A pixel shift interval $K_1$ of four pixels results in a somewhat coarser search with comparisons every four pixels. The pixel shift interval can be different in the horizontal direction and the vertical direction. For the convenience of explanation, we use the same pixel shift interval for both directions.

The process then uses the chosen search process and a designated matching criteria to compare current supermacroblock 235 to candidate supermacroblocks in search area 215 to find a best candidate in the first search range (step 312). Using sum of absolute distortions (SAD) of pixel values as the matching criteria, each supermacroblock comparison may be defined as follows:

$$SAD(i, j) = \sum_{x=0}^{31} \sum_{y=0}^{31} |r(x, y) - s(x + i, y + j)|$$

for $-p_1 \leq i \leq +p_1$ and $-q_1 \leq j \leq +q_1$, where r is the current 32×32 pixel supermacroblock 235 and s is a 32×32 pixel candidate supermacroblock. The (i,j) pair that produces a minimum value for SAD (i,j) defines the motion vector of current supermacroblock 235. A motion vector of (1,1), for example, means that the supermacroblock in the reference frame one pixel removed horizontally to the right and one pixel removed vertically to the bottom closely resembles current supermacroblock 235.

Figure 4A:
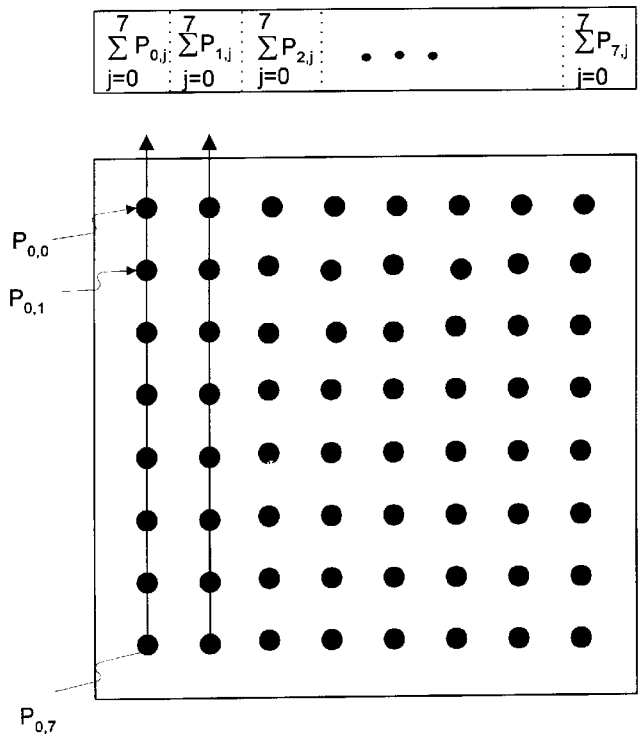
FIG. 4A is a diagram showing a method of calculating a vertical integral projection for an 8×8 array of pixel information.
Figure 4B:
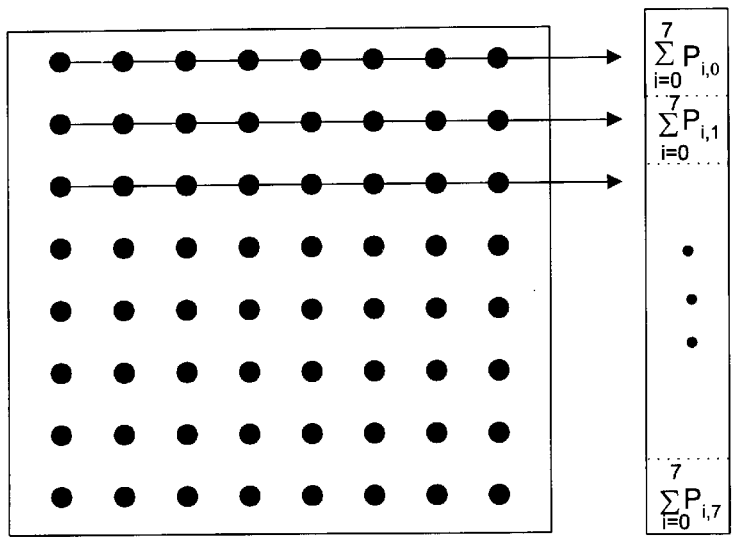
FIG. 4B is a diagram showing a method of calculating a horizontal integral projection for an 8×8 array of pixel information.

Each supermacroblock calculation as explained above would require 32×32 calculations. The number of calculations may be reduced, however, by calculating the SAD only for a selected subset of the 32×32=1024 pixels. The number of calculations can also be reduced by performing the block comparisons using integral projection information rather than pixel domain information. An integral projection of pixel information is a sum of some number of image pixel values along a certain horizontal or vertical direction. FIG. 4A shows a vertical integral projection; FIG. 4B shows a horizontal integral projection.

Integral projection information can be obtained by calculating one-dimensional integral projection arrays from pixel information or by calculating integral projection information from discrete cosine transform (DCT) coefficient data from, for example, a digital video decoder. In particular, the present invention may be used to reduce the computations necessary, and therefore decrease the computation time needed, to convert from one digital video format to another such as, for example, from digital video (DV) format to MPEG format.

The DCT may be described mathematically as follows:

$$Q(h, v) = C(h)C(v) \sum_{y=0}^{7} \sum_{x=0}^{7} P(x, y) \cos\left(\frac{\pi h(2x+1)}{16}\right) \cos\left(\frac{\pi v(2y+1)}{16}\right)$$

for h=0,1, . . . 7 and v=0,1, . . . 7 and where $$C(h) = \begin{cases} \frac{1}{2\sqrt{2}}, & h = 0 \\ \frac{1}{2}, & h = 1 \text{ to } 7 \end{cases}$$

and $$C(v) = \begin{cases} \frac{1}{2\sqrt{2}}, & v = 0 \\ \frac{1}{2}, & v = 1 \text{ to } 7 \end{cases}$$

P (x,y) is an 8×8 block of pixel data and Q(h,v) is an 8×8 block of DCT coefficients. Mathematically, if an 8×8 block of DCT coefficients is used as input to a one-dimensional horizontal inverse discrete cosine transform (IDCT), the result will be an 8×8 array, the first row of which contains the sums of each column of pixel information multiplied by a constant. The first row therefore equals a one-dimensional vertical projection of that 8×8 block of pixel information. Similarly, if the same 8×8 block of DCT coefficients is input to a one-dimensional vertical IDCT, the first column of the result will be equivalent to a one-dimensional horizontal projection of the underlying 8×8 block of pixel information. The vertical and horizontal integral projections may be used to estimate the motion vectors.

In the current example, each supermacroblock equals four neighboring macroblocks, each macroblock comprised of four neighboring 8×8 blocks. Each supermacroblock, therefore, comprises sixteen 8×8 blocks. The number of calculations required for each supermacroblock comparison may be reduced by using vertical or horizontal integral projection information. Two vertical (or horizontal) projections per each 8×8 block may be calculated by summing, for example, the 32 pixels of columns (or rows) 1–4 of the 8×8 block and the 32 pixels of columns (or rows) 5–8 of the 8×8 block. If DCT domain information is available, the two integral projections can be obtained by performing a one-dimensional 2-point IDCT on the two lowest coefficients of column (or row) 1 of every two-dimensional 8×8 DCT block. Each supermacroblock can then be represented by 2*16=32 vertical (or horizontal) integral projections. Each supermacroblock comparison would thereby be reduced to 32 calculations, plus the calculations necessary to obtain the integral projections.

Those skilled in the art will recognize that integral projections may be also calculated, for example, by summing every two columns (or rows) of an 8×8 pixel block to obtain four integral projections or by summing individual columns (or rows) to obtain eight integral projections. Similarly, integral projection arrays can be obtained from DCT domain information by performing one-dimensional 4-point or 8-point IDCTs on the coefficients of the DCT block. These methods will result in more calculations than the 2-point integral projection arrays used above but fewer calculations than the same method using pixel information.

Figure 5:
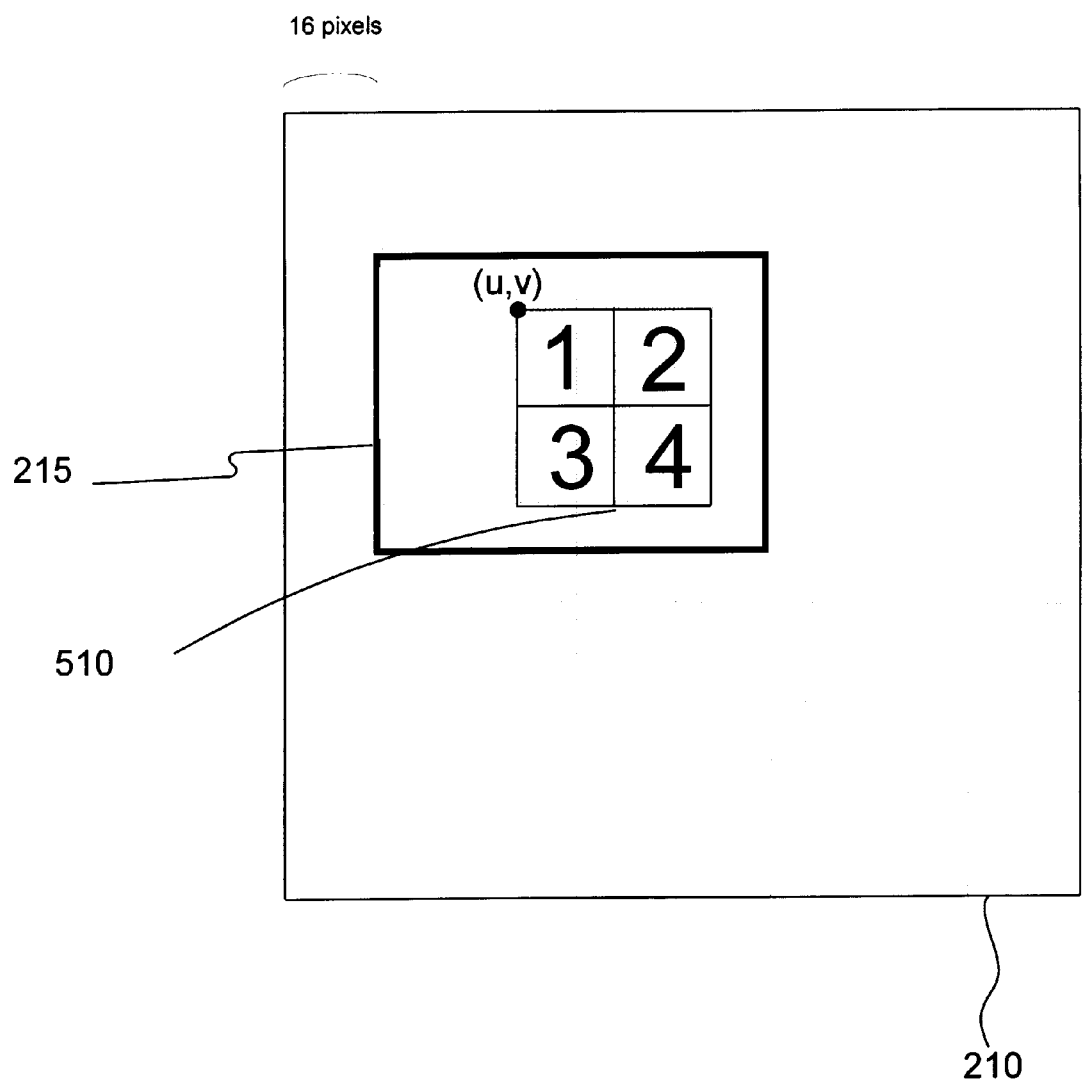
FIG. 5 is a diagram showing one step of a block-matching process consistent with the present invention.
Figure 6:
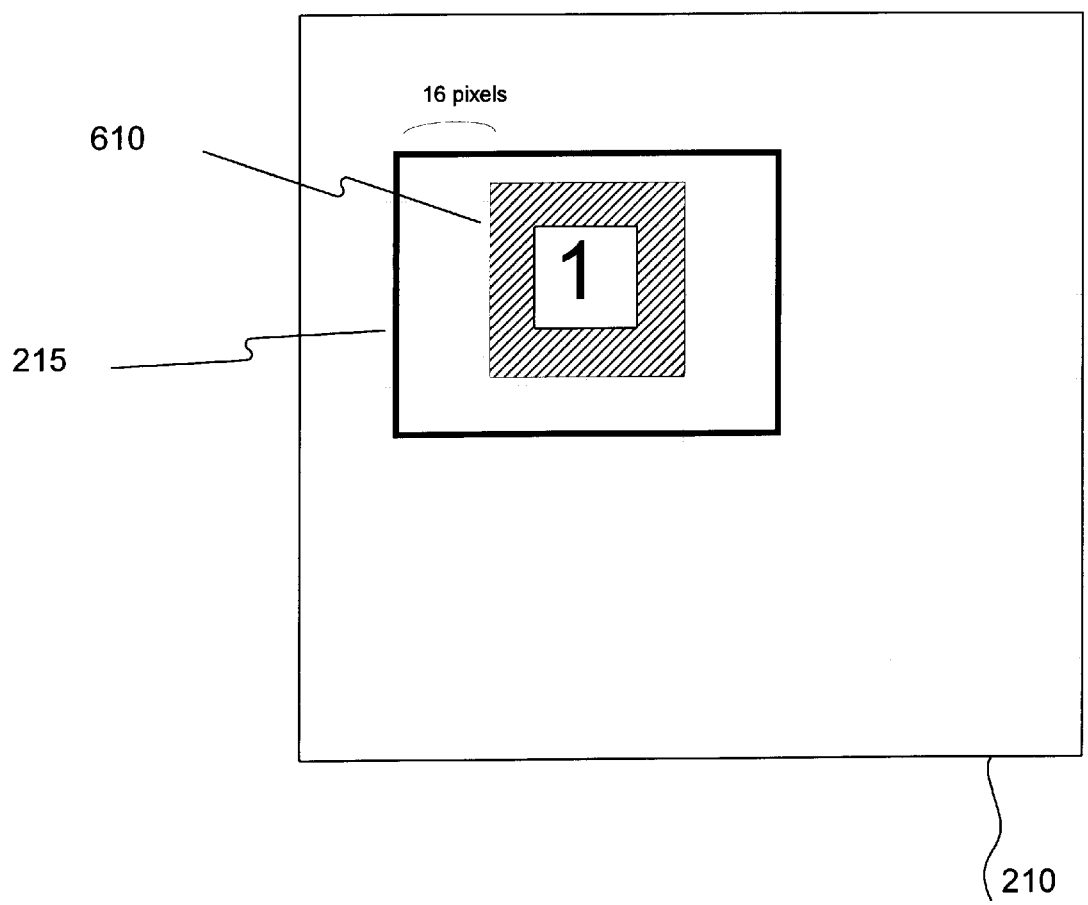
FIG. 6 is a diagram showing one step of a block-matching process consistent with the present invention.

FIG. 5 shows best supermacroblock 510, the result of the first search process. The upper left corner of best supermacroblock 510 is labeled (u,v) and is the motion vector for the current supermacroblock in the first search process. As shown in FIG. 5, supermacroblock 510 is then divided into multiple candidate macroblocks 1, 2, 3, and 4 to begin the second stage of the hierarchical search process of the present invention (step 314). The process determines a search range ($\pm p_2$, $\pm q_2$) for the second stage (step 316). For each candidate macroblock 1, 2, 3, and 4, a search area is determined based on the candidate macroblock and search range ($\pm p_2$, $\pm q_2$). For example, FIG. 6 shows search area 610 as defined by candidate macroblock 1 and search range ($\pm p_2$, $\pm q_2$). Search range ($\pm p_2$, $\pm q_2$) may be predetermined or may be determined dynamically. Search range values $p_2$ and $q_2$ may be the same for all frames or may depend on the time difference between the current frame and the reference frame. Furthermore, although search range values $p_2$ and $q_2$ can be any integer value greater than zero, but less than the frame size, choosing search values of $p_2$ less than $p_1$ and $q_2$ less than $q_1$ results in a second search area 610 that is smaller than the first search area 215 in FIG. 2. Generally, if the search area is smaller, the search area can be searched in finer detail to further refine the motion vector found as a result of the first stage.

The process then selects a second stage search process (step 318) and pixel shift interval, $K_2$ (step 320). Best candidate macroblocks may be chosen using any publicly available block-matching search method, such as a conventional full search, or may be chosen by comparing macroblocks at some predetermined pixel search interval within the search area. In one embodiment of the present invention, the "best" candidate macroblock is selected using the motion estimation method described in U.S. patent application Ser. No. 09/081,279, to Chang et al. identified above. $K_2$ can be any value greater than 0, but less than the search range. Choosing $K_2=1$, for example, is equivalent to performing a full search making comparisons at one pixel intervals.

For each of candidate macroblocks 1, 2, 3, and 4, the process performs a search using the selected search process of the designated search area (step 322). Using sum of absolute distortions (SAD) of pixel values as the matching criteria, each macroblock comparison may be defined as follows:

$$SAD(i, j) = \sum_{x=0}^{15} \sum_{y=0}^{15} |r(x, y) - s(x+i, y+j)|$$

for $u-p_2<=i<=u+p_2$ and $u-q_2<=j<=u+q_2$, where r is the current 16×16 pixel macroblock 230 and s is a 16×16 pixel candidate macroblock in search area 610.

In the current example, each macroblock equals four neighboring 8×8 blocks. The number of calculations required for each macroblock comparison may be reduced by using vertical or horizontal integral projection information. Two vertical (or horizontal) projections per each 8×8 block may be calculated by summing, for example, the 32 pixels of columns (or rows) 1–4 of the 8×8 block and the 32 pixels of columns (or rows) 5–8 of the 8×8 block. If DCT domain information is available, the two integral projections can be obtained by performing a one-dimensional 2-point IDCT on the two lowest coefficients of column (or row) 1 of every two-dimensional 8×8 DCT block. Each macroblock can then be represented by 2*4=8 vertical (or horizontal) integral projections. Each macroblock comparison would thereby be reduced to 8 calculations, plus the calculations necessary to obtain the integral projections.

Integral projections may also be calculated, for example, by summing every two columns (or rows) of an 8×8 pixel block to obtain four integral projections or by summing individual columns (or rows) to obtain eight integral projections. Similarly, integral projection arrays can be obtained from DCT domain information by performing one-dimensional 4-point or 8-point IDCTs on the coefficients of the DCT block. These methods will result in more calculations that the 2-point integral projection arrays used above but fewer calculations than the same method using pixel information.

The motion vector for the current macroblock may be further refined by a third hierarchical search (step 324). A third search area is determined based on the best candidate macroblock of the second hierarchical search step and search range ($\pm p_3$, $\pm q_3$). Search range ($\pm p_3$, $\pm q_3$) may be predetermined or may be determined dynamically. Search range values $p_3$ and $q_3$ may be the same for all frames or may depend on the time difference between the current frame and the reference frame. Furthermore, although search range values $p_3$ and $q_3$ can be any integer value greater than zero, but less than the frame size, choosing search values of $p_3$ less than $p_2$ and $q_3$ less than $q_2$ results in a third search area that is smaller than the second search area 510 in FIG. 5. At this stage in the hierarchical search, however, a search range of ($\pm 1$, $\pm 1$) is recommended.

The process then selects a third stage search process and pixel shift interval, $K_3$. $K_3$ can be any value greater than 0, but less than the search range. At this stage in the hierarchical search, however, a pixel shift interval $K_3=1$ is recommended. Choosing $K_3=1$, for example, is equivalent to performing a full search making comparisons beginning at one pixel intervals.

The motion vector for the current macroblock may be further refined by a fourth hierarchical search (step 326). A fourth search area is determined based on the best candidate macroblock of the third hierarchical search step and search range ($\pm p_4$, $\pm q_4$). Search range ($\pm p_4$, $\pm q_4$) may be predetermined or may be determined dynamically. Search range values $p_4$ and $q_4$ may be the same for all frames or may depend on the time difference between the current frame and the reference frame. Furthermore, although search range values $p_4$ and $q_4$ can be any integer value greater than zero, but less than the frame size, choosing search values of $p_4$ less than $p_3$ and $q_4$ less than $q_3$ results in a fourth search area that is smaller than the third search area. At this stage in the hierarchical search, however, a search range of ($\pm 0.5$, $\pm 0.5$) is recommended.

The process then selects a fourth stage search process and pixel shift interval, $K_4$. $K_4$ can be any value greater than 0, but less than the search range. At this stage in the hierarchical search, however, a pixel shift interval $K_4=0.5$ is recommended. Choosing $K_4=1$, for example, is equivalent to performing a half-pixel search as is well understood by those skilled in the art.

When the fourth hierarchical search step is completed, the (i,j) pair that produced a minimum value for SAD (i,j) in the fourth search step defines the motion vector of current macroblock 230. A motion vector of (1,1), for example, means that the macroblock in the reference frame one pixel removed horizontally to the right and one pixel removed vertically to the bottom closely resembles current macroblock 240. The motion vector is recorded, and the array of pixel difference is recorded as the residue for that current macroblock and candidate macroblock (step 328).

The third search stage (step 324) and/or the fourth search stage (step 326) can be omitted in some implementations where further reduction of operations is desired.

B. System

Figure 7:
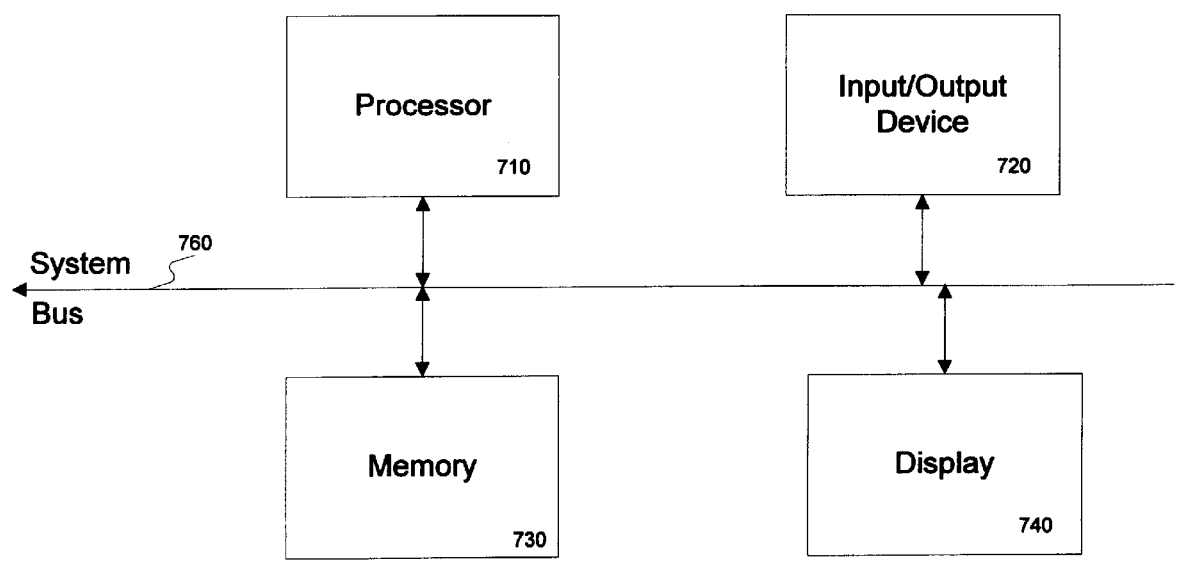
FIG. 7 is a diagram of a system consistent with the present invention.

FIG. 7 illustrates a system 705 consistent with the present invention. As shown in FIG. 7, a processor 710 is connected to at least one input/output (I/O) device 720 via any suitable data connection. I/O device 720 can be any device capable of passing information to or receiving data from processor 710. By way of example only, I/O device 720 may be a digital camcoder connected through IEEE 1394 interface. Processor 710 may be any commonly available digital processor such as, for example, a Pentium. Processor 710 may be a single processor or multiple processors. Faster processors, however, will decrease execution time of the invention.

The system of the present invention also includes memory 730 capable of storing data processed by processor 710 and data sent to or received from I/O device 720. System 705 may be connected to a display 740, such as a cathode ray tube (CRT), for displaying information. Processor 710, I/O device 720, memory 730, and display 740 are connected via a standard system bus 760. FIG. 7 shows an exemplary network where each hardware component may be implemented by conventional, commercially available computer systems components.

Figure 8:
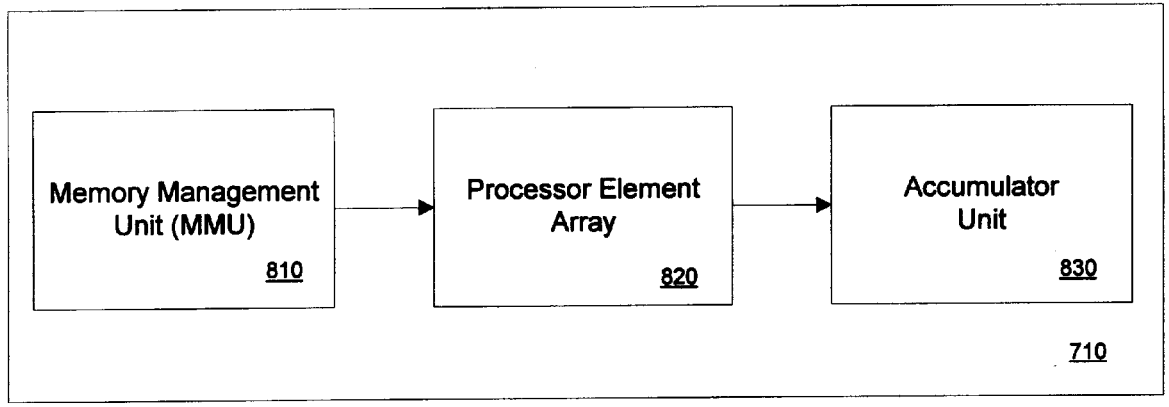
FIG. 8 is a diagram of a processor consistent with the present invention.

FIG. 8 illustrates a processor consistent with the present invention. Processor 710 may comprise one or more memory management units (MMU) 810, one or more processor element arrays 820, and one or more accumulator units 830. Processor element array 820 may comprise an array of processor elements, not shown. Processor elements may comprise, for example, a subtraction and adder units for calculating the SAD between the blocks. MMU 810 may be used to buffer the data for processor element array 820. Accumulator unit 830 may be, for example, an adder unit that adds the outputs from processor element array 825.

Referring again to FIG. 7, processor 710 executes one or more sequences of one or more instructions contained in memory 730. Such instructions may be read into memory 730 from a computer-readable medium via input/output device 720. Execution of the sequences of instructions contained in memory 730 causes processor 710 to perform the process steps described herein. In an alternative implementation, hard-wired circuitry may be used in place of or in combination with software instructions to implement the invention. Thus implementations of the invention are not limited to any specific combination of hardware circuitry and software.

The term "computer-readable medium" as used herein refers to any media that participates in providing instructions to processor 710 for execution. Such a medium may take many forms, including but not limited to, non-volatile media, volatile media, and transmission media. Non-volatile media includes, for example, optical or magnetic disks. Volatile media includes dynamic memory, such as memory 730. Transmission media includes coaxial cables, copper wire, and fiber optics, including the wires that comprise system bus 760. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described hereinafter, or any other medium from which a computer can read. Network signals carrying digital data, and possibly program code, to and from system 705 through system bus 760 are exemplary forms of carrier waves transporting the information. In accordance with the present invention, program code received by system 705 may be executed by processor 710 as it is received, and/or stored in memory 730, or other non-volatile storage for later execution.

It will be apparent to those skilled in the art that various modifications and variations can be made in the methods and systems consistent with the present invention without departing from the spirit or scope of the invention. The true scope of the invention is defined by the following claims.

What is claimed is:

1. A method for obtaining a motion vector between first and second frames of video image data, comprising the steps of:
   (a) determining a current macroblock of the first frame comprising a two-dimensional array of equal-sized block of pixel information;
   (b) determining a current supermacroblock of the first frame comprising the current macroblock and a plurality of macroblocks;
   (c) selecting a first search area of the second frame based on the current supermacroblock and a first search range;
   (d) determining a best candidate supermacroblock in the first search area based on a displacement criterion and the current supermacroblock;
   (e) dividing the best candidate supermacroblock into a plurality of candidate macroblocks;
   (f) selecting a plurality of second search areas of the second frame based on the plurality of candidate macroblocks and a second search range;
   (g) determining a first best candidate macroblock in one of the plurality of second search areas based on the displacement criterion and the current macroblock; and,
   (h) determining a first motion vector representing the distance between the current macroblock and the first best candidate macroblock.

2. The method of claim 1, further comprising the steps of:
   (i) selecting a third search area of the second frame based on the first best candidate macroblock and a third search range; and,
   (j) determining a second best candidate macroblock in the third search area based on the displacement criterion and the current macroblock; and
   (k) determining a second motion vector representing a distance between the current macroblock and the second best candidate macroblock.

3. The method of claim 2, further comprising the steps of:
   (l) selecting a fourth search area of the second frame based on the second best candidate macroblock and a fourth search range; and,
   (m) determining a third best candidate macroblock in the fourth search area based on the predetermined displacement criterion and the current supermacroblock; and
   (n) determining a third motion vector representing a distance between the current supermacroblock and the second best candidate macroblock.

4. The method of claim 1, wherein the step of determining a best candidate supermacroblock comprises the steps of:
   (a) determining a first set of candidate supermacroblocks by selecting at least one candidate supermacroblock in each strip of pixel information based on the current supermacroblock and the displacement criterion;

(b) determining a second set of candidate macroblocks by selecting at least one candidate macroblock in each of at least one second search areas based on the current supermacroblock and the displacement criterion, each of the at least one second search areas based on the first set of candidate supermacroblocks; and (c) obtaining a best candidate supermacroblock from the second set of candidate supermacroblocks based on the displacement criterion.

5. The method of claim 1, wherein the step of determining a first best candidate macroblock comprises the steps of:

(a) determining a first set of candidate supermacroblocks by selecting at least one candidate supermacroblock in each strip of pixel information based on the current supermacroblock and the displacement criterion;

(b) determining a second set of candidate macroblocks by selecting at least one candidate macroblock in each of at least one second search areas based on the current supermacroblock and the displacement criterion, each of the at least one second search areas based on the first set of candidate supermacroblocks; and (c) obtaining a best candidate supermacroblock from the second set of candidate supermacroblocks based on the displacement criterion.

6. A method for obtaining a motion vector between first and second frames of video image data, comprising the steps of:

(a) determining a current macroblock of the first frame comprising a two-dimensional array of equal-sized block of pixel information;

(b) obtaining at least one integral projection array representing the current macroblock;

(c) determining a current supermacroblock of the first frame comprising the current macroblock and a plurality of macroblocks;

(d) obtaining at least one integral projection array representing the current supermacroblock;

(e) selecting a first search area of the second frame based on the current supermacroblock and a first search range;

(f) determining a best candidate supermacroblock in the first search area based on a displacement criterion and the at least one integral projection array representing the current supermacroblock;

(g) dividing the best candidate supermacroblock into a plurality of candidate macroblocks;

(h) selecting a plurality of second search areas of the second frame based on the plurality of candidate macroblocks and a second search range;

(i) determining a first best candidate macroblock in one of the plurality of second search areas based on the displacement criterion and the at least one integral projection array representing the current macroblock; and, (j) determining a first motion vector representing the distance between the current macroblock and the first best candidate macroblock.

7. The method of claim 6, further comprising the steps of:

(k) selecting a third search area of the second frame based on the first best candidate macroblock and a third search range; and, (l) determining a second best candidate macroblock in the third search area based on the displacement criterion and the current macroblock; and (m) determining a second motion vector representing a distance between the current macroblock and the second best candidate macroblock.

8. The method of claim 7, further comprising the steps of:

(n) selecting a fourth search area of the second frame based on the second best candidate macroblock and a fourth search range; and, (o) determining a third best candidate macroblock in the fourth search area based on the predetermined displacement criterion and the current supermacroblock; and (p) determining a third motion vector representing a distance between the current supermacroblock and the second best candidate macroblock.

9. The method of claim 6, wherein the step of determining a best candidate supermacroblock comprises the steps of:

(a) determining a first set of candidate supermacroblocks by selecting at least one candidate supermacroblock in each strip of pixel information based on the integral projection arrays representing the current supermacroblock and the displacement criterion;

(b) determining a second set of candidate macroblocks by selecting at least one candidate macroblock in each of at least one second search areas based on the integral projection arrays representing the current supermacroblock and the displacement criterion, each of the at least one second search areas based on the first set of candidate supermacroblocks; and (c) obtaining a best candidate supermacroblock from the second set of candidate supermacroblocks based on the displacement criterion.

10. The method of claim 6, wherein the step of determining a first best candidate macroblock comprises the steps of:

(a) determining a first set of candidate supermacroblocks by selecting at least one candidate supermacroblock in each strip of pixel information based on the integral projection arrays representing the current supermacroblock and the displacement criterion;

(b) determining a second set of candidate macroblocks by selecting at least one candidate macroblock in each of at least one second search areas based on the integral projection arrays representing the current supermacroblock and the displacement criterion, each of the at least one second search areas based on the first set of candidate supermacroblocks; and (c) obtaining a best candidate supermacroblock from the second set of candidate supermacroblocks based on the displacement criterion.

11. An apparatus for obtaining a motion vector between first and second frames of video image data comprising:

a memory having program instructions, and a processor configured to use the program instructions to perform the steps of:

(a) determining a current macroblock of the first frame comprising a two-dimensional array of equal-sized block of pixel information;

(b) determining a current supermacroblock of the first frame comprising the current macroblock and a plurality of macroblocks;

(c) selecting a first search area of the second frame based on the current supermacroblock and a first search range;

(d) determining a best candidate supermacroblock in the first search area based on a displacement criterion and the current supermacroblock;

(e) dividing the best candidate supermacroblock into a plurality of candidate macroblocks;

(f) selecting a plurality of second search areas of the second frame based on the plurality of candidate macroblocks and a second search range;

(g) determining a first best candidate macroblock in one of the plurality of second search areas based on the displacement criterion and the current macroblock; and, (h) determining a first motion vector representing a distance between the current macroblock and the first best candidate macroblock.

12. The apparatus of claim 11, wherein the processor is configured to use program instructions to perform the steps of:

(i) selecting a third search area of the second frame based on the first best candidate macroblock and a third search range; and, (j) determining a second best candidate macroblock in the third search area based on the displacement criterion and the current macroblock; and (k) determining a second motion vector representing a distance between the current macroblock and the second best candidate macroblock.

13. The apparatus of claim 12, wherein the processor is configured to use program instructions to perform the steps of:

(l) selecting a fourth search area of the second frame based on the second best candidate macroblock and a fourth search range; and, (m) determining a third best candidate macroblock in the fourth search area based on the displacement criterion and the current supermacroblock; and (n) determining a third motion vector representing a distance between the current supermacroblock and the second best candidate macroblock.

14. The apparatus of claim 11, wherein the step of determining a best candidate supermacroblock comprises the steps of:

(a) determining a first set of candidate supermacroblocks by selecting at least one candidate supermacroblock in each strip of pixel information based on the current supermacroblock and the displacement criterion;

(b) determining a second set of candidate macroblocks by selecting at least one candidate macroblock in each of at least one second search areas based on the current supermacroblock and the displacement criterion, each of the at least one second search areas based on the first set of candidate supermacroblocks; and (c) obtaining a best candidate supermacroblock from the second set of candidate supermacroblocks based on the displacement criterion.

15. The apparatus of claim 11, wherein the step of determining a first best candidate macroblock comprises the steps of:

(a) determining a first set of candidate supermacroblocks by selecting at least one candidate supermacroblock in each strip of pixel information based on the current supermacroblock and the displacement criterion;

(b) determining a second set of candidate macroblocks by selecting at least one candidate macroblock in each of at least one second search areas based on the current supermacroblock and the displacement criterion, each of the at least one second search areas based on the first set of candidate supermacroblocks; and (c) obtaining a best candidate supermacroblock from the second set of candidate supermacroblocks based on the displacement criterion.

16. An apparatus for obtaining a motion vector between first and second frames of video image data comprising:

a memory having program instructions, and a processor configured to use the program instructions to perform the steps of:

(a) determining a current macroblock of the first frame comprising a two-dimensional array of equal-sized block of pixel information;

(b) obtaining at least one integral projection array representing the current macroblock;

(c) determining a current supermacroblock of the first frame comprising the current macroblock and a plurality of macroblocks;

(d) obtaining at least one integral projection array representing the current supermacroblock;

(e) selecting a first search area of the second frame based on the current supermacroblock and a first search range;

(f) determining a best candidate supermacroblock in the first search area based on a displacement criterion and the at least one integral projection array representing the current supermacroblock;

(g) dividing the best candidate supermacroblock into a plurality of candidate macroblocks;

(h) selecting a plurality of second search areas of the second frame based on the plurality of candidate macroblocks and a second search range;

(i) determining a first best candidate macroblock in one of the plurality of second search areas based on the displacement criterion and the at least one integral projection array representing the current macroblock; and, (j) determining a first motion vector representing a distance between the current macroblock and the first best candidate macroblock.

17. The apparatus of claim 16, wherein the processor is configured to use program instructions to perform the steps of:

(k) selecting a third search area of the second frame based on the first best candidate macroblock and a third search range; and, (l) determining a second best candidate macroblock in the third search area based on the displacement criterion and the current macroblock; and (m) determining a second motion vector representing a distance between the current macroblock and the second best candidate macroblock.

18. The apparatus of claim 17, wherein the processor is configured to use program instructions to perform the steps of:

(n) selecting a fourth search area of the second frame based on the second best candidate macroblock and a fourth search range; and, (o) determining a third best candidate macroblock in the fourth search area based on the displacement criterion and the current supermacroblock; and (p) determining a third motion vector representing a distance between the current supermacroblock and the second best candidate macroblock.

19. The apparatus of claim 16, wherein the step of determining a best candidate supermacroblock comprises the steps of:

(a) determining a first set of candidate supermacroblocks by selecting at least one candidate supermacroblock in each strip of pixel information based on the integral projection arrays representing the current supermacroblock and the displacement criterion;

(b) determining a second set of candidate macroblocks by selecting at least one candidate macroblock in each of at least one second search areas based on the integral projection arrays representing the current supermacroblock and the displacement criterion, each of the at least one second search areas based on the first set of candidate supermacroblocks; and (c) obtaining a best candidate supermacroblock from the second set of candidate supermacroblocks based on the displacement criterion.

20. The apparatus of claim 16, wherein the step of determining a first best candidate macroblock comprises the steps of:

(a) determining a first set of candidate supermacroblocks by selecting at least one candidate supermacroblock in each strip of pixel information based on the integral projection arrays representing the current supermacroblock and the displacement criterion;

(b) determining a second set of candidate macroblocks by selecting at least one candidate macroblock in each of at least one second search areas based on the integral projection arrays representing the current supermacroblock and the displacement criterion, each of the at least one second search areas based on the first set of candidate supermacroblocks; and (c) obtaining a best candidate supermacroblock from the second set of candidate supermacroblocks based on the displacement criterion.

21. A computer program product comprising:

a computer-usable medium having computer-readable code embodied therein for obtaining a motion vector between first and second frames of video image data, the computer-usable medium comprising:

(a) a component configured to determine a current macroblock of the first frame comprising a two-dimensional array of equal-sized block of pixel information;

(b) a component configured to determine a current supermacroblock of the first frame comprising the current macroblock and a plurality of macroblocks;

(c) a component configured to select a first search area of the second frame based on the current supermacroblock and a first search range;

(d) a component configured to determine a best candidate supermacroblock in the first search area based on a displacement criterion and the current supermacroblock;

(e) a component configured to divide the best candidate supermacroblock into a plurality of candidate macroblocks;

(f) a component configured to select a plurality of second search areas of the second frame based on the plurality of candidate macroblocks and a second search range;

(g) a component configured to determine a first best candidate macroblock in one of the plurality of second search areas based on the displacement criterion and the current macroblock; and, (h) a component configured to determine a first motion vector representing a distance between the current macroblock and the first best candidate macroblock.

22. The product of claim 21, further comprising:

(i) a component configured to select a third search area of the second frame based on the first best candidate macroblock and a third search range; and, (j) a component configured to determine a second best candidate macroblock in the third search area based on the displacement criterion and the current macroblock; and (k) a component configured to determine a second motion vector representing a distance between the current macroblock and the second best candidate macroblock.

23. The product of claim 22, further comprising:

(l) a component configured to select a fourth search area of the second frame based on the second best candidate macroblock and a fourth search range; and, (m) a component configured to determine a third best candidate macroblock in the fourth search area based on the displacement criterion and the current supermacroblock; and (n) a component configured to determine a third motion vector representing a distance between the current supermacroblock and the second best candidate macroblock.

24. The product of claim 21, wherein the step of a component configured to determine a best candidate supermacroblock comprises the steps of:

(a) a component configured to determine a first set of candidate supermacroblocks by selecting at least one candidate supermacroblock in each strip of pixel information based on the current supermacroblock and the displacement criterion;

(b) a component configured to determine a second set of candidate macroblocks by selecting at least one candidate macroblock in each of at least one second search areas based on the current supermacroblock and the displacement criterion, each of the at least one second search areas based on the first set of candidate supermacroblocks; and (c) a component configured to obtain a best candidate supermacroblock from the second set of candidate supermacroblocks based on the displacement criterion.

25. The product of claim 21, wherein the step of a component configured to determine a first best candidate macroblock comprises the steps of:

(a) a component configured to determine a first set of candidate supermacroblocks by selecting at least one candidate supermacroblock in each strip of pixel information based on the current supermacroblock and the displacement criterion;

(b) a component configured to determine a second set of candidate macroblocks by selecting at least one candidate macroblock in each of at least one second search areas based on the current supermacroblock and the displacement criterion, each of the at least one second search areas based on the first set of candidate supermacroblocks; and (c) a obtain component configured to obtain best candidate supermacroblock from the second set of candidate supermacroblocks based on the displacement criterion.

26. A computer program product comprising:

a computer-usable medium having computer-readable code embodied therein for obtaining a motion vector between first and second frames of video image data, the computer-usable medium comprising:

(a) a component configured to determine a current macroblock of the first frame comprising a two-dimensional array of equal-sized block of pixel information;

(b) a component configured to obtain at least one integral projection array representing the current macroblock;

(c) a component configured to determine a current supermacroblock of the first frame comprising the current macroblock and a plurality of macroblocks;

(d) a component configured to obtain at least one integral projection array representing the current supermacroblock;

(e) a component configured to select a first search area of the second frame based on the current supermacroblock and a first search range;

(f) a component configured to determine a best candidate supermacroblock in the first search area based on a displacement criterion and the at least one integral projection array representing the current supermacroblock;

(g) a component configured to divide the best candidate supermacroblock into a plurality of candidate macroblocks;

(h) a component configured to select a plurality of second search areas of the second frame based on the plurality of candidate macroblocks and a second search range;

(i) a component configured to determine a first best candidate macroblock in one of the plurality of second search areas based on the displacement criterion and the at least one integral projection array representing the current macroblock; and, (j) a component configured to determine a first motion vector representing a distance between the current macroblock and the first best candidate macroblock.

27. The product of claim 26, further comprising:

(k) a component configured to select a third search area of the second frame based on the first best candidate macroblock and a third search range; and, (l) a component configured to determine a second best candidate macroblock in the third search area based on the displacement criterion and the current macroblock; and (m) a component configured to determine a second motion vector representing a distance between the current macroblock and the second best candidate macroblock.

28. The product of claim 27, further comprising:

(n) a component configured to select a fourth search area of the second frame based on the second best candidate macroblock and a fourth search range; and, (o) a component configured to determine a third best candidate macroblock in the fourth search area based on the displacement criterion and the current supermacroblock; and (p) a component configured to determine a third motion vector representing a distance between the current supermacroblock and the second best candidate macroblock.

29. The product of claim 26, wherein the component configured to determine a best candidate supermacroblock comprises the steps of:

(a) a component configured to determine a first set of candidate supermacroblocks by selecting at least one candidate supermacroblock in each strip of pixel information based on the integral projection arrays representing the current supermacroblock and the displacement criterion;

(b) a component configured to determine a second set of candidate macroblocks by selecting at least one candidate macroblock in each of at least one second search areas based on the integral projection arrays representing the current supermacroblock and the displacement criterion, each of the at least one second search areas based on the first set of candidate supermacroblocks; and (c) a component configured to obtain a best candidate supermacroblock from the second set of candidate supermacroblocks based on the displacement criterion.

30. The product of claim 26, wherein the component configured to determine a first best candidate macroblock comprises the steps of:

(a) a component configured to determine a first set of candidate supermacroblocks by selecting at least one candidate supermacroblock in each strip of pixel information based on the integral projection arrays representing the current supermacroblock and the displacement criterion;

(b) a component configured to determine a second set of candidate macroblocks by selecting at least one candidate macroblock in each of at least one second search areas based on the integral projection arrays representing the current supermacroblock and the displacement criterion, each of the at least one second search areas based on the first set of candidate supermacroblocks; and (c) a component configured to obtain a best candidate supermacroblock from the second set of candidate supermacroblocks based on the displacement criterion.

31. A system obtaining a motion vector between first and second frames of video image data comprising:

(a) means for determining a current macroblock of the first frame comprising a two-dimensional array of equal-sized block of pixel information;

(b) means for determining a current supermacroblock of the first frame comprising the current macroblock and a plurality of macroblocks;

(c) means for selecting a first search area of the second frame based on the current supermacroblock and a first search range;

(d) means for determining a best candidate supermacroblock in the first search area based on a displacement criterion and the current supermacroblock;

(e) means for dividing the best candidate supermacroblock into a plurality of candidate macroblocks;

(f) means for selecting a plurality of second search areas of the second frame based on the plurality of candidate macroblocks and a second search range;

(g) means for determining a first best candidate macroblock in one of the plurality of second search areas based on the displacement criterion and the current macroblock; and, (h) means for determining a first motion vector representing a distance between the current macroblock and the first best candidate macroblock.

32. A system for obtaining a motion vector between first and second frames of video image data comprising:

(a) means for determining a current macroblock of the first frame comprising a two-dimensional array of equal-sized block of pixel information;

(b) means for obtaining at least one integral projection array representing the current macroblock;

(c) means for determining a current supermacroblock of the first frame comprising the current macroblock and a plurality of macroblocks;

(d) means for obtaining at least one integral projection array representing the current supermacroblock;
(e) means for selecting a first search area of the second frame based on the current supermacroblock and a first search range;
(f) means for determining a best candidate supermacroblock in the first search area based on a displacement criterion and the at least one integral projection array representing the current supermacroblock;
(g) means for dividing the best candidate supermacroblock into a plurality of candidate macroblocks;

(h) means for selecting a plurality of second search areas of the second frame based on the plurality of candidate macroblocks and a second search range;
(i) means for determining a first best candidate macroblock in the second search area based on the displacement criterion and the at least one integral projection array representing the current macroblock; and,
(j) means for determining a first motion vector representing a distance between the current macroblock and the first best candidate macroblock.

* * * * *

UNITED STATES PATENT AND TRADEMARK OFFICE
CERTIFICATE OF CORRECTION

PATENT NO. : 6,130,912
DATED : October 10, 2000
INVENTOR(S) : Ching-Fang, et al.

It is certified that error appears in the above-identified patent and that said Letters Patent is hereby corrected as shown below:

Claim 25, col. 18, line 54, "a obtain component configured to obtain best" should read --a component configured to obtain a best--.

Signed and Sealed this

Eighth Day of May, 2001

Attest:

NICHOLAS P. GODICI

*Attesting Officer*    *Acting Director of the United States Patent and Trademark Office*